3,230,220
ISOCYANURATE COMPOUNDS AND PREPARATIVE PROCESSES
Donald L. Burdick, Mission, and Myron D. Osborn, Overland Park, Kans., assignors, by mesne assignments, to Gulf Oil Corporation, Pittsburgh, Pa., a corporation of Pennsylvania
No Drawing. Filed Apr. 24, 1961, Ser. No. 104,844
7 Claims. (Cl. 260—248)

This invention relates to novel isocyanurate organic compounds and processes. More particularly, it relates to tri(carboxymethyl)isocyanurate and intermediates, derivatives, and salts thereof. Additionally, it relates to certain processes related to the preparation of the above compounds.

Tri(carboxymethyl)isocyanurate as provided by this invention can be represented by the following structure formula:

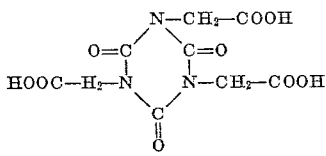

It is a solid tribasic carboxylic acid, readily obtainable in crystalline form. It is useful in a number of applications; e.g., it is useful in the preparation of its polymers such as polyesters and polyamides, which in turn are useful in forming coatings and molded plastic articles. Of particular interest are its polyesters in which a portion of the carboxyl groups do not enter into the formation of polymer-forming ester linkages but rather remain available to lend enhanced water solubility.

Tri(carboxymethyl)isocyanurate can be prepared as by reacting a reactive cyanuric acid salt, e.g., an alkali metal salt of cyanuric acid with three mole equivalents of a halo-substituted acetonitrile or a halo-substituted acetamide to form the respective derivatives, tri(cyanomethyl)isocyanurate and tri(aminocarbonylmethyl)isocyanurate. These derivatives are hydrolyzed as by exposure to a strong mineral acid, such as concentrated hydrochloric acid, to provide the free acid form of tri(carboxymethyl)isocyanurate.

In the preparation of tri(carboxymethyl)isocyanurate by the employment of a halo-substituted acetamide or a halo-substituted acetonitrile agent, the respective chloro-substituted agent is preferred in view of the efficient functioning of the chloro-substituted agents in the preparations and because of their ready availability. However, other halo-substituted representatives of these agents can be used if desired, for example, the corresponding bromo derivatives.

It has been found preferred to employ trisodium cyanurate in the reactions. However, the potassium and other salts can be employed with satisfactory results.

Any reaction solvent which is inert and will form a suitable reaction mixture at elevated temperatures can be used. For use in the above reactions, the lower dialkyl-substituted amides of lower carboxylic acids, such as dimethylformamide, diethylformamide, and dimethylacetamide, are suitable solvents. Presently it is preferred to employ dimethylformamide as the reaction solvent.

In the preparation, it must be borne in mind that to form the tri-substituted acid of this invention it is necessary to employ at least the required stoichiometric three moles of the above agents for each mole of the alkali metal salt of cyanuric acid of the reaction mixture. Of course, variations can be made from three-to-one ratio of the starting compounds as desired in order to insure the most efficient utilization of the agent or the cyanuric acid salt. However, in practice it has been found suitable to adhere rather closely to the stoichiometric three-to-one ratio.

The reaction is carried on at an elevated reaction temperature for a time sufficient to bring satisfactory yields. It has been found in use of chloroacetamide that the reaction is conveniently carried on by adding the chloroacetamide to a reaction solvent containing trisodium cyanurate maintained at a temperature of about 50° C. about 150° C., about 100° C. usually being suitable. The reaction will be carried on for a time sufficient to insure an adequate yield, about two to twenty hours being ordinarily ample, depending upon the concentrations of the reactants employed, the reaction temperature, and the like. In the preparation of the intermediate employing a halo-substituted acetonitrile, conditions and concentrations similar to those described above with respect to the halo-substituted acetamide can be employed.

The tri(aminocarbonylmethyl) and tri(cyanomethyl) isocyanurates are isolated from their respective reaction mixtures on cooling. At times the intermediate compounds will precipitate out of the cooled reaction mixtures, depending upon the concentrations and the reaction solvent employed. If the intermediate compound precipitates, it can be removed by following conventional procedures, such as by filtration and centrifugation. If the intermediate compound does not precipitate from the cooled reaction mixture, precipitation can be induced conventionally as by removal of a portion of the reaction solvent by evaporation under reduced pressure, by adding to the reaction mixture a solvent in which the product is insoluble, and the like. The crude reaction intermediate compounds can be further purified by recrystallization from any suitable solvent such as dimethylformamide or acetonitrile.

As above mentioned, the intermediates tri(aminocarbonylmethyl)isocyanurate and tri(cyanomethyl)isocyanurate are convertible to the desired tri(carboxymethyl) isocyanurate by hydrolysis with, for example, a concentrated mineral acid such as concentrated hydrochloric acid. The hydrolysis can be conveniently effected by heating the hydrolysis mixture of the intermediate at an elevated temperature for a sufficient period of time to convert to the desired tri(carboxymethyl)isocyanurate. A hydrolysis time of about one to ten hours at reflux temperature is usually sufficient to bring about the desired hydrolysis with hydrochloric acid. Tri(carboxymethyl) isocyanurate is recovered and isolated from the hydrolysates by following conventional procedures. Customarily, the free acid form of tri(carboxymethyl)isocyanurate is relatively insoluble in most of the mineral acids employed for the hydrolysis, for example, in concentrated hydrochloric acid, and can be recovered from the cooled hydrolysate conveniently by following simple filtration procedures. The tri(carboxymethyl)isocyanurate compound can be recrystallized as desired, as from distilled water.

Various salts of tri(carboxymethyl)isocyanurate can be prepared by following conventional salt formation procedures. Inorganic salts, for example, the alkali metal salts such as the potassium and sodium salts, can be conveniently prepared by adding the required stoichiometric quantities of sodium or potassium hydroxide to an inert solvent such as water or dimethylformamide containing the triacid, and evaporating off the solvent, leaving a residue of the sodium or potassium salt. Organic amine salts, such as salts of alkyl amines and organic diamines, can be prepared by adding the required amount of amine and tri(carboxymethyl)isocyanurate to an inert mutual solvent in which the salt when formed is relatively insoluble.

For this purpose, common solvent and solvent mixtures, such as methanol-acetone solvent mixtures, as well as aqueous combinations thereof, have been found useful. Any diamine, either aryl or aliphatic, suitable for the preparation of polyamides can be employed to form diamine salts of tri(carboxymethyl)isocyanurate. Presently preferred diamines for the salt formation because of economy and other considerations are the diamines having four to twelve carbon atoms, such as tetramethylene, pentamethylene, hexamethylene, octamethylene, decamethylene, dodecamethylene, p-phenylenedimethylene, p-phenylene, and the like diamines. Hexamethylenediamine is a particularly important diamine in the salt formation because of its ready availability. The formed salts of polymethylene diamines are convertible by heating in conventional manner to the respective polyamides of tri(carboxymethyl)isocyanurate.

Additionally, polyesters can be formed by condensing as by heating at elevated temperatures tri(carboxymethyl)isocyanurate with the required amounts of a diol, for example, ethylene glycol, diethylene glycol, alpha-propylene glycol, and decamethylene glycol. The relative quantities of the tri(carboxymethyl)isocyanurate and diol can be varied somewhat to alter average polymer chain lengths, degree of esterification of the carboxyl groups, and the like. To form a largely linear polymer, at least about one mole of diol is employed for each mole of tri(carboxymethyl)isocyanurate. If desired, the diols employed may have additional functional groups which do not interfere with polyester formation, including additional hydroxyl groups as provided by glycerol and pentaerythritol. The polyesters can be varied if desired by replacing a portion of the tri(carboxymethyl)isocyanurate acid with a dicarboxylic acid agent, e.g., up to about fifty mole percent thereof. Any dicarboxylic acid agent can be employed for this purpose which has from two to about twenty carbon atoms, preferably four to twelve carbon atoms as well as its acids anhydride or halide when appropriate. Illustrative of these acids are the following aryl and aliphatic dicarboxylic acids: succinic, adipic, o-phthalic, terphthalic, sebacic, 1,4-naphthalene-dicarboxylic, azelaic, glutaric, 3-ethylsebacic, and the like acids.

Surprisingly, tri(carboxymethyl)isocyanurate is markedly superior as to stability on heating over tri(beta-carboxyethyl)isocyanurate. Likewise, derived esters of tri(beta-carboxymethyl)isocyanurate formed from monohydric alcohols as well as the polyesters formed with diols, above described, have shown in many instances a like superiority of heat stability, e.g., tri(hexoxycarbonylmethyl)isocyanurate and tri(octoxycarbonylmethyl)isocyanurate esters show only about one-third the degradative increase in acid number when heated at 600° F. for three hours as shown by the corresponding esters of the tri(beta-carboxyethyl) acid under the same conditions.

The following illustrative examples more fully describe the preparations of the tri(carboxymethyl)isocyanurates of this invention.

EXAMPLE 1

*Preparation of tri(aminocarbonylmethyl)isocyanurate*

A slurry of trisodium cyanurate (195 g., 1.0 mole) in 200 ml. of dimethylformamide is heated to 95° C. To the dimethylformamide mixture is added a solution of chloroacetamide (280.5 g., 3.0 mole) in 500 ml. of dimethylformamide in a dropwise manner with stirring over a two hour period. After the addition is completed, the reaction mixture is maintained for an additional eighteen-hour period at 90° C. The reaction mixture is then cooled, whereupon a precipitate is formed. The precipitate, which consists of tri(aminocarbonylmethyl)isocyanurate is removed by filtration, is washed thoroughly with water, followed by acetone washing, providing 240.2 g. (0.8 mole) of crystalline tri(aminocarbonylmethyl)isocyanurate. On drying, the product showed a melting point of 350°–351° C. Calculated for $C_9H_{12}N_6O_6$: C, 36.0; H, 4.0; N, 28.0. Found: C, 35.7; H, 3.77; N, 27.9.

EXAMPLE 2

*Preparation of tri(carboxymethyl)isocyanurate*

A mixture of 5 g. (0.017 mole) of the tri(aminocarbonylmethyl)isocyanurate as provided in Example 1 in 125 ml. of concentrated hydrochloric acid (11.7 N) is refluxed for three hours. The hydrolysate is cooled whereupon the produced tri(carboxymethyl)isocyanurate separates as a white crystalline solid. The crystalline product is removed by filtration, is washed with distilled water, and is dried. Melting point: 264°–266° C. Calculated neutral equivalent: 101.0; Found: 102.2.

EXAMPLE 3

*Preparation of tri(cyanomethyl)isocyanurate*

Chloroacetonitrile (19.5 g., 0.1 mole) is added dropwise with stirring over a period of two hours to a slurry consisting of 19.5 g. (0.1 mole) of trisodium cyanurate in 100 ml. of dimethylformamide. The reaction mixture is maintained during the addition at about 50° C. The reaction is continued on completion of the addition of the chloroacetonitrile for an additional two and one-half hours at about a 50° C. temperature. On completion of the reaction, the mixture is cooled. The white crystalline precipitate is removed by filtration. The removed precipitate upon threatment with 6N hydrochloric acid yields free cyanuric acid.

The filtrate containing the tri(cyanomethyl)isocyanurate product is evaporated to dryness in vacuo. The dry residue is triturated with 250 ml. of boiling water. The washed crystalline tri(cyanomethyl)isocyanurate product is removed by filtration. The dried product after recrystallization from acetonitrile has a melting point of 232°–234° C. Elemental analysis: Calculated for $C_9H_6N_6O_3$: C, 43.9; H, 2.4; N, 34.1. Found: C, 43.9; H, 2.5; N, 33.6.

EXAMPLE 4

*Preparation of tri(aminocarbonylmethyl)isocyanurate*

A quantity of 2.6 g. of tri(cyanomethyl)isocyanurate as provided by Example 3 dissolved in 10 ml. of concentrated hydrochloric acid (11.7 N) is heated at reflux temperature for five minutes. The reflux mixture is cooled and the white crystalline precipitate consisting of tri(aminocarbonylmethyl)isocyanurate is removed by filtration. The crystalline product is washed with distilled water and is dried. Yield 2.85 g. Melting point: 350°–351° C. A mixed sample of the tri(aminocarbonylmethyl)isocyanurate provided by this example and by Example 1 above showed no depression of melting point, indicating the compounds to be identical. Infrared analysis also shows the product to be tri(aminocarbonylmethyl)isocyanurate.

EXAMPLE 5

*Preparation of tri(carboxymethyl)isocyanurate polyester*

A mixture of 91.0 g. (0.3 mole) of tri(carboxymethyl) isocyanurate, 53.0 g. (0.7 mole) of propylene glycol, and 14.5 g. (0.1 mole) of adipic acid is heated at 140°–150° C. after mixing for three and one-half hours. A polyester is formed of the above ingredients having an acid number of about 85 (80 to 90). The polymer is dissolved in 150 ml. of water containing 8 ml. of concentrated ammonium hydroxide to provide a transparent solution containing fifty percent by weight of solids. This ammonium hydroxide solution of the polyester has a viscosity of X–Y (Gardner Scale).

What is claimed is:

1. A process for preparing tri(carboxymethyl)isocyanurate comprising the following steps: reacting a reactive salt of cyanuric acid with a compound selected from the group consisting of halo-substituted acetonitrile and halo-substituted acetamide, said halo substituent being selected from the group consisting of chlorine and bromine, in an inert reaction medium at a temperature of about 50° C. to 150° C. to form the intermediate product and hydrolyzing said intermediate product in the presence of an acid to yield tri(carboxymethyl)isocyanurate.

2. A process in accordance with claim 1 wherein the halo-substituted compound is chloroacetonitrile.

3. A process in accordance with claim 1 wherein the halo-substituted compound is chloroacetonitrile and the inert reaction medium is dimethylformamide.

4. A process in accordance with claim 1 wherein the halo-substituted compound is chloroacetamide.

5. A process in accordance with claim 1 wherein the halo-substituted compound is chloroacetamide and the inert reaction medium is dimethylformamide.

6. The process consisting of reacting chloroacetonitrile with sodium cyanurate in dimethylformamide as reaction medium at a temperature of about 50° to 150° C. to yield tri(cyanomethyl)isocyanurate.

7. The process consisting of reacting chloroacetamide with sodium cyanurate in dimethylformamide as reaction medium at a temperature of about 50° to 150° C. to yield tri(carbamylmethyl)isocyanurate.

References Cited by the Examiner

UNITED STATES PATENTS

| | | | |
|---|---|---|---|
| 1,918,222 | 7/1933 | Ellis | 260—75 |
| 2,536,849 | 1/1951 | Kaiser et al. | 260—248 |
| 2,551,731 | 5/1951 | Drewitt | 260—75 N |
| 2,809,942 | 10/1957 | Cooke | 260—248 |
| 2,860,139 | 11/1958 | Meis et al. | 260—248 |
| 2,866,801 | 12/1958 | Himel et al. | 260—248 X |
| 2,951,079 | 8/1960 | Schroeder et al. | 260—248 |
| 2,952,665 | 9/1960 | Bunge et al. | 260—248 X |
| 2,977,371 | 3/1961 | Dixon | 260—248 X |
| 3,016,379 | 1/1962 | Lloyd | 260—248 X |
| 3,075,979 | 1/1963 | Tazuma et al. | 260—248 |

FOREIGN PATENTS 812,312   8/1951   Germany.

OTHER REFERENCES

Allied Chemical Product Bulletin "Cyanuric Acid," page 6, Allied Chemical Co., Nitrogen Division (New York), April 9, 1959.

Frazier et al.: Journ. of Org. Chem., vol. 25, p. 1944 to 1946 (1960).

Migdrichian: The Chemistry of Organic Cyanogen Compounds, ACS Monograph Series No. 105, page 364, Reinhold Publishing Corp., New York (1947).

Reppe: Annalen der Chemie, vol. 596, p. 167 (1955).

Smolin et al.: "s-Triazines and Derivatives," page 397, Interscience Publishers, Inc., New York (February 1959).

WALTER A. MODANCE, *Primary Examiner.*

PHILIP E. MANGAN, DUVAL T. McCUTCHEN, JOHN D. RANDOLPH, *Examiners.*